United States Patent
Hazani et al.

(10) Patent No.: US 10,405,356 B2
(45) Date of Patent: *Sep. 3, 2019

(54) DISTRIBUTION OF TIME-DIVISION MULTIPLEXED (TDM) MANAGEMENT SERVICES IN A DISTRIBUTED ANTENNA SYSTEM, AND RELATED COMPONENTS, SYSTEMS, AND METHODS

(71) Applicant: Corning Optical Communications LLC, Hickory, NC (US)

(72) Inventors: Ami Hazani, Ra'anana (IL); Ofer Nisan, Netanya (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,052

(22) Filed: May 9, 2018

(65) Prior Publication Data

US 2018/0263055 A1 Sep. 13, 2018

Related U.S. Application Data

(63) Continuation of application No. 15/447,580, filed on Mar. 2, 2017, now Pat. No. 9,973,968, which is a (Continued)

(51) Int. Cl.
*H04L 1/00* (2006.01)
*H04W 74/08* (2009.01)
(Continued)

(52) U.S. Cl.
CPC .......... *H04W 74/085* (2013.01); *H04B 7/04* (2013.01); *H04J 3/1694* (2013.01); *H04W 28/04* (2013.01);
(Continued)

(58) Field of Classification Search
CPC . H04W 74/085; H04W 28/04; H04W 72/042; H04W 74/04; H04W 88/085; H04W 92/12
See application file for complete search history.

(56) References Cited

U.S. PATENT DOCUMENTS 5,339,184 A 8/1994 Tang
5,767,485 A 6/1998 Kumada
(Continued)

FOREIGN PATENT DOCUMENTS

EP 1942598 A2 7/2008

OTHER PUBLICATIONS

International Search Report and Written Opinion PCT/IL2013/050671 dated Jan. 30, 2014.

*Primary Examiner* — Abdelnabi O Musa
(74) *Attorney, Agent, or Firm* — C. Keith Montgomery (57) ABSTRACT

Distribution of management services in distributed antenna systems having a central unit and remote units configured to time-division multiplex (TDM) downlink and/or uplink management signals into time slots to form a TDM management frame signal. In this manner, collision will not occur between multiple management signals communicated over a common communications medium at the same time in the distributed antenna system. Collision detection and management mechanism can add design complexity, cost by requiring additional components, and require additional area on electronic boards. The TDM management frame signal may also be modulated at a carrier frequency before being combined with RF communications signals so that the combined signals are within a linear range of shared certain communications components to reduce cost and area.

13 Claims, 7 Drawing Sheets

Related U.S. Application Data continuation of application No. 14/599,710, filed on Jan. 19, 2015, now Pat. No. 9,621,293, which is a continuation of application No. PCT/IL2013/050671, filed on Aug. 7, 2013.

(60) Provisional application No. 61/680,421, filed on Aug. 7, 2012.

(51) Int. Cl.
| | | |
|---|---|---|
| *H04W 74/04* | (2009.01) | |
| *H04B 7/04* | (2017.01) | |
| *H04J 3/16* | (2006.01) | |
| *H04W 72/04* | (2009.01) | |
| *H04W 28/04* | (2009.01) | |
| *H04W 88/08* | (2009.01) | |
| *H04W 92/12* | (2009.01) | |

(52) U.S. Cl.
CPC ..... *H04W 72/042* (2013.01); *H04W 72/0413* (2013.01); *H04W 72/0446* (2013.01); *H04W 74/04* (2013.01); *H04W 88/085* (2013.01); *H04W 92/12* (2013.01)

(56) References Cited

U.S. PATENT DOCUMENTS

| | | | | |
|---|---|---|---|---|
| 5,867,485 | A * | 2/1999 | Chambers | H04B 10/25753 370/281 |
| 6,549,772 | B1 * | 4/2003 | Chavez | H04W 88/085 370/328 |
| 7,844,182 | B2 | 11/2010 | Mostert et al. | |
| 2005/0059437 | A1 * | 3/2005 | Son | H04W 52/0245 455/574 |
| 2008/0014948 | A1 * | 1/2008 | Scheinert | H04W 16/26 455/444 |
| 2009/0316611 | A1 * | 12/2009 | Stratford | H04J 3/0608 370/294 |

* cited by examiner

DISTRIBUTION OF TIME-DIVISION MULTIPLEXED (TDM) MANAGEMENT SERVICES IN A DISTRIBUTED ANTENNA SYSTEM, AND RELATED COMPONENTS, SYSTEMS, AND METHODS

PRIORITY APPLICATION

This application is a continuation of U.S. application Ser. No. 15/447,580, filed Mar. 2, 2017, which is a continuation of U.S. application Ser. No. 14/599,710, filed Jan. 19, 2015, which is a continuation of International Application No. PCT/IL13/050671, filed on Aug. 7, 2013, which claims the benefit of priority to U.S. Provisional Application No. 61/680,421, filed on Aug. 7, 2012, all of which being incorporated herein by reference.

BACKGROUND

Field of the Disclosure

The technology of the disclosure relates to distributed antenna systems configured to provide communications signals over a communications medium to and from one or more remote units for communicating with client devices.

Technical Background

Distributed antenna systems (DASs) are effective when deployed inside buildings or other environments where client devices may not otherwise receive radio-frequency (RF) signals from a base station or other source. DASs can be used to provide coverage for applications such as public safety, cellular telephony, wireless local access networks (LANs), location tracking, and medical telemetry inside buildings and over campuses. A typical DAS establishes a number of radio-frequency (RF) antenna coverage areas, also referred to as "antenna coverage areas." The antenna coverage areas are formed by remotely distributed antenna units (RAUs), which are sometimes referred to as remote units (RUs). A number of remote units are arranged to create an array of relatively small antenna coverage areas, with each RAU typically accommodating a small number of wireless client device users. This arrangement thus provides a uniform high quality signal and high throughput for wireless users.

DASs may be configured to distribute management signals in addition to RF communications signals. Management signals allow the central unit and remote units to communicate additional information without disturbing the RF communications services. Management signals include instructions for system operations, calibration information, gain control, alarm information, fault information, etc. DASs may combine management signals with RF communications signals to be communicated over the same communications medium for point to multi-point communications. For example, the RF communications signals may be at higher frequencies than the management signals that are modulated at a lower frequency or left in baseband, such that the RF communications signals do not interfere with the management signals. However, for point to multi-point communications, collisions will occur between management signals communicated to different remote units over a common communications medium at the same time. "Back-off" collision detection and avoidance systems can be employed to wait for a defined period of time until the communications medium is clear of other management signals before asserting new management signals on the communications medium. However, throughput is reduced to half-duplex as a result. Collision detection and management mechanism may also add design complexity, cost by requiring additional components, and require additional area on electronic boards.

SUMMARY OF THE DETAILED DESCRIPTION

According to a first embodiment, a central unit for providing communications signals and management signals in a distributed antenna system is configured to receive a plurality of downlink management signals from at least one management controller. The central unit is also configured to time-division multiplex (TDM) the plurality of downlink management signals into time slots of a designated remote unit among a plurality of remote units to form a TDM downlink management frame signal. The central unit is also configured to receive downlink RF communication signals of at least one RF communications frequency band for at least one RF communications service, and to combine the TDM downlink management frame signal with the downlink RF communication signals. The central unit is also configured to send the combined TDM downlink management frame signal and the downlink RF communications signals to the plurality of remote units over a downlink communications link. The central unit may also be configured to receive a plurality of combined uplink RF communications signals and TDM uplink management frame signals over an uplink communications link from each of the plurality of remote units for the at least one RF communications service.

In another embodiment, a method for providing communications signals comprises receiving a plurality of downlink management signals from at least one management controller. The method also comprises TDM of the plurality of downlink management signals into time slots of a designated remote unit among a plurality of remote units to form a TDM downlink management frame signal, receiving downlink RF communication signals of at least one RF communications frequency band for at least one RF communications service, combining the TDM downlink management frame signal with the downlink RF communication signals, sending the combined TDM downlink management frame signal and the downlink RF communications signals to the plurality of remote units over a downlink communications link, and receiving a plurality of combined uplink RF communications signals and TDM uplink management frame signals over an uplink communications link from each of the plurality of remote units for the at least one RF communications service.

In another embodiment, a remote unit for providing communications signals and management signals in a distributed antenna system is configured to receive a plurality of uplink management signals from at least one management controller. The remote unit is also configured to time-division multiplex (TDM) the plurality of uplink management signals into individual time slots to form a TDM uplink management frame signal, receive uplink RF communication signals of at least one RF communications frequency band for at least one RF communications service, combine the TDM uplink management frame signal with the uplink RF communication signals, and to send the combined TDM uplink management frame signal and the uplink RF communications signals to a central unit over an uplink communications link. The remote unit may also be configured to receive a plurality of combined downlink RF communications signals and TDM downlink management frame signals over a downlink communications link from the central unit for the at least one RF communications service.

In another embodiment, a method of providing communications signals comprises receiving a plurality of uplink management signals from at least one management controller, time-division multiplexing (TDM) the plurality of uplink management signals into individual time slots to form a TDM uplink management frame signal, receiving uplink RF communication signals of at least one RF communications frequency band for at least one RF communications service, combining the TDM uplink management frame signal with the uplink RF communication signals, sending the combined TDM uplink management frame signal and the uplink RF communication signals to a central unit over an uplink communications link, and receiving a plurality of combined downlink RF communications signals and TDM downlink management frame signals.

The distributed antenna system also includes the plurality of remote units. Each of the remote units is configured to receive a plurality of uplink management signals from a management controller, to time-division multiplex (TDM) the plurality of uplink management signals into individual time slots to form a TDM uplink management frame signal, to receive uplink RF communication signals of at least one RF communications frequency band for RF communications services, to combine the TDM uplink management frame signal with the uplink RF communication signals, and to send the combined TDM uplink management frame signal and the uplink RF communications signals to the at least one central unit over an uplink communications link. The remote unit may be further configured to receive combined downlink RF communications signals and TDM downlink management frame signals over a downlink communications link from the central unit.

The central units and remote units disclosed herein can be configured to support both RF communication services and digital data services. These communications services can be wired or wireless communications services that are typically communicated wirelessly, but may be provided over non-wireless medium (e.g., electrical conductor and/or optical fiber). The RF communication services and digital data services can be provided over any type of communications medium, including electrical conductors and optical fiber to wireless client devices, such as remote units for example. Examples of RF communications services are cellular services and radio communications services. Examples of digital data services include LAN using Ethernet, WLAN, WiMax, WiFi, Digital Subscriber Line (DSL), telephony, WCDMA, and LTE, which can support voice and data. Digital data signals can be provided over separate communications media for providing RF communication services, or over a common communications medium with RF communications signals.

Additional features and advantages will be set forth in the detailed description which follows, and in part will be readily apparent to those skilled in the art from that description or recognized by practicing the embodiments as described herein, including the detailed description that follows, the claims, as well as the appended drawings.

The foregoing general description and the following detailed description present embodiments, and are intended to provide an overview or framework for understanding the nature and character of the disclosure. The drawings are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Figure 1:
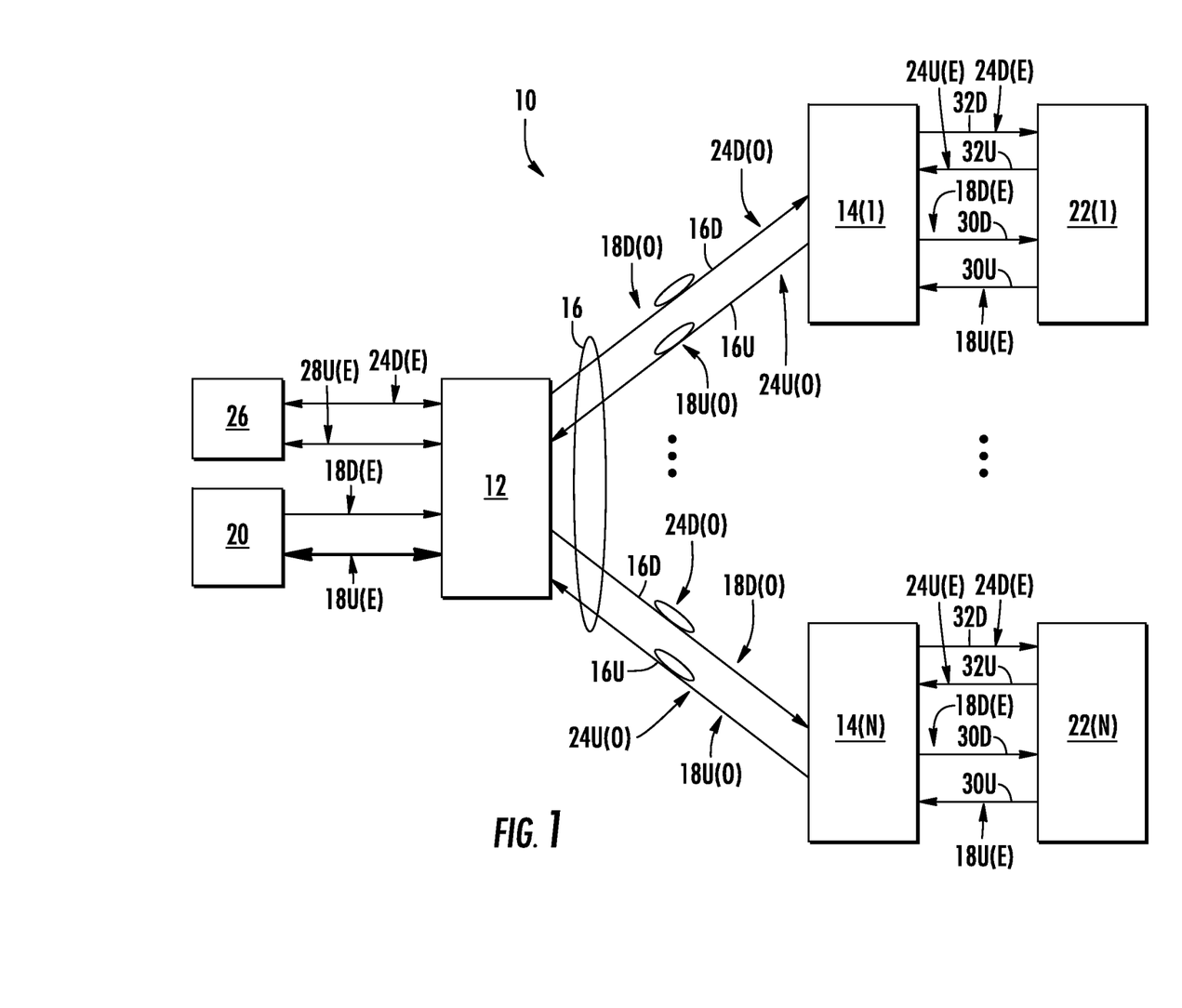
FIG. 1 is a schematic diagram of an exemplary point to multi-point optical fiber-based distributed antenna system configured to distribute RF communications services and management services.

Before discussing details of the particular components of the distributed antenna system 10 with regard to FIGS. 2-6, a general overview of the distributed antenna system 10, or DAS 10, in FIG. 1 is first provided. In this regard, the distributed antenna system 10 in FIG. 1 includes a central unit 12. The central unit 12 is communicatively coupled to one or more remote units 14(1)-14(N) via an optical fiber communications medium 16. Thus, in this example, the distributed antenna system 10 is an optical fiber-based distributed antenna system. However, the present disclosure is not limited to an optical fiber-based distributed antenna system. Other communications mediums including twisted pair conductors (e.g., CAT 5/6/7 cable) and coaxial cables could be employed or employed in conjunction with optical fiber. The distributed antenna system 10 is configured to distribute RF communications signals and management signals. In this regard, with regard to distribution of RF communications signals, the central unit 12 is configured to receive downlink RF communications signals 18D from a RF communications network, such as through a base station 20 as an example. In this embodiment, the downlink RF communications signals 18D are downlink electrical RF communications signals 18D(E). The downlink electrical RF communications signals 18D(E) can be combined and converted to downlink optical RF communications signals 18D(O) by the central unit 12 in this embodiment. The downlink optical RF communications signals 18D(O) are split and distributed by the central unit 12 over at least one downlink optical fiber 16D to each of the remote units 14(1)-14(N) to provide one or more RF communications services to the client devices 22(1)-22(N) in wired and/or wireless communication with the remote units 14(1)-14(N).

With continuing reference to FIG. 1, the remote units 14(1)-14(N) are convert the downlink optical RF communications signals 18D(O) back to downlink electrical RF communications signals 18D(E), and communicate the downlink electrical RF communications signals 18D(E) to one or more client devices 22(1)-22(N) to provide the one more RF communications services to the client devices 22(1)-22(N). The remote units 14(1)-14(N) can be configured to communicate through wired or wireless communications to the client devices 22(1)-22(N). For example, if the remote units 14(1)-14(N) are configured to be directly coupled to one client device 22(1)-22(N) each, up to 'N' client devices 22(1)-22(N) may be connected to the remote units 14(1)-14(N) in the DAS 10.

The remote units 14(1)-14(N) are also configured to receive uplink RF communications signals 18U from the client devices 22(1)-22(N) to be distributed to the central unit 12 and the base station(s) 20. The uplink RF communications signals 18U are received from the client devices 22(1)-22(N) as uplink electrical RF communications signals 18U(E), which are combined and converted to uplink optical RF communications signals 18U(O). The remote units 14(1)-14(N) distribute the uplink signals 18U(O) over at least one uplink optical fiber 16U to the central unit 12. The central unit 12 receives and converts the uplink optical RF communications signals 18U(O) back to uplink electrical RF communications signals 18U(E). The central unit 12 provides the uplink electrical RF communications signals 18U(E) to the base station(s) 20 to support the one or more RF communications services from the client devices 22(1)-22(N).

With continuing reference to FIG. 1, note that one common downlink optical fiber 16D may be provided between the central unit 12 and the remote units 14(1)-14(N) to carry downlink communications signals in a point-to-multipoint communications configuration. Similarly, one common uplink optical fiber 16U may be provided between the central unit 12 and the remote units 14(1)-14(N) to carry uplink communications signals in a point-to-multipoint communications configuration. Bi-directional communications in the downlink and uplink directions are provided in this embodiment of the DAS 10 in FIG. 1 by providing separate downlink optical fiber(s) 16D and uplink optical fiber(s) 16U. Further, due to the point-to-multipoint configuration of the DAS 10 in FIG. 1, the embodiments disclosed provide TDM of management signals distributed in the DAS 10 to ensure that the management signals do not interfere with providing bi-directional, full-duplex communications. Alternatively, individual downlink optical fibers 16D may be provided between the central unit 12 and each remote unit 14(1)-14(N) to carry downlink communications signals in a point-to-point communications configuration. The individual uplink optical fibers 16U may be provided between the central unit 12 and each remote unit 14(1)-14(N) to uplink communications signals in a point-to-point communications configuration.

As a further option, the downlink optical fiber 16D and uplink optical fiber 16U could be provided as a single optical fiber to carry both downlink and uplink signals. Time-division multiplexing of the downlink and uplink signals may be employed to allow the downlink and uplink signals to be communicated over a single optical fiber. Wave-division multiplexing (WDM), such as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety, may also be employed in this scenario to prevent collisions between downlink and uplink communications signals in the same or overlapping frequency bands. Further, U.S. patent application Ser. No. 12/892,424 also discloses distributed digital data communications signals in a distributed antenna system which may also be distributed in the DAS 10 either in conjunction with RF communications signals or not.

With reference back to FIG. 1, the central unit 12 of the DAS 10 is also configured to distribute management signals between one or more sources, such as between a management controller 26, and the remote units 14(1)-14(N). The management controller 26 may be a computer or console as non-limiting examples. For example, the management controller 26 may be configured to provide management signals to perform a variety of tasks or applications. Examples of management signals that may be distributed in the distributed antenna system 10 include configuration signals, control signals, gain control signals, monitoring signals, and configuration signals, fault signals, and alarm signals. The management signals are not for providing RF communications services between the base station(s) 20 and the client devices 22(1)-22(N). The management signals may be communicated according to any protocol desired, such as the Ethernet protocol.

The central unit 12 is configured to receive downlink management signals 24D from the management controller 26. The central unit 12 distributes the downlink management signals 24D to the remote units 14(1)-14(N) to be distributed to the client devices 22(1)-22(N) communicatively coupled to the remote units 14(1)-14(N). The management controller 26 provides downlink management signals 24D to be distributed by the central unit 12 to any number of remote units 14(1)-14(N). Thus, to prevent the downlink management signals 24D destined for different remote units 14(1)-14(N) from interfering with each other, the central unit 12 time-division multiplexes the downlink electrical management signals 24D(E) into individual time slots in a downlink TDM management frame signal to be distributed to the remote units 14(1)-14(N). The central unit 12 converts the downlink TDM electrical management signal to downlink TDM optical management signals 24D(O) to be distributed over the at least one downlink optical fiber 16D to the remote units 14(1)-14(N) and the client devices 22(1)-22(N) in this embodiment. The central unit 12 can be configured to either broadcast all downlink electrical management signals 24D(E) to all remote units 14(1)-14(N), or provide specific downlink electrical management signals 24D(E) to individual remote units 14(1)-14(N).

In this embodiment, as will be described in more detail below, the downlink TDM optical management signals 24D(O) are combined with the downlink optical RF communications signals 18D(O) in different frequency bands and distributed over the same downlink optical fiber 16D. The remote units 14(1)-14(N) are configured to receive and convert downlink TDM optical management signals 24D(O) to downlink TDM electrical management signals, which can then be parsed by each remote unit 14(1)-14(N) to receive a particular downlink electrical management signal 24D(E) destined for the remote unit 14(1)-14(N).

The remote units 14(1)-14(N) are also configured to create and provide uplink management signals 24U be distributed to the central unit 12 and the management controller 26. For example, it may be desired for the remote units 14(1)-14(N) to have the ability to provide the same type of management signals described above to the central unit 12, which are not related to RF communication services provided to the base station(s) 20. In this regard, uplink electrical management signals 24U(E) may be provided by the client devices 22(1)-22(N) to the remote units 14(1)-14(N). The remote units 14(1)-14(N) time-division multiple the uplink electrical management signals 24U(E) into individual time slots in an uplink TDM electrical management frame signal. Thus, the management signals received by the central unit 12 from different remote units (1)-14(N) do not interfere with each other. The remote units 14(1)-14(N) combine the received uplink TDM electrical management signals with uplink electrical RF communications signals 18U(E), and then configured to convert the combined uplink TDM electrical management signals and uplink electrical RF communications signals 18U(E) to combined uplink TDM optical management signals 24U(O) and uplink optical RF communications signals 18U(O) to be distributed over the at least one uplink optical fiber 16U to the central unit 12.

With continuing reference to FIG. 1, the central unit 12 is configured to convert the received combined uplink TDM optical management signals 24U(O) and uplink optical RF communications signal 18U(O) into combined uplink TDM electrical management signals 24U(E) and uplink electrical RF communications signal 18U(E). The central unit 12 then splits the uplink TDM electrical management signals 24U(E) from the uplink electrical RF communications signal 18U(E). The central unit 12 is configured to translate the uplink TDM electrical management signals 24U(E) into individual uplink electrical management signals 28U(E) from the different remote units 14(1)-14(N) and provide the uplink electrical management signals 28U(E) to the management controller(s) 26.

With continuing reference to FIG. 1, the remote units 14(1)-14(N) in the DAS 10 are communicatively coupled to the client devices 22(1)-22(N) by a separate electrical RF communications medium 30 and an electrical management communications medium 32. In this embodiment, the electrical RF communications medium 30 includes a separate downlink electrical RF communications medium 30D and an uplink electrical RF communications medium 30U. Alternatively, the downlink electrical RF communications medium 30D and uplink electrical RF communications medium 30D may be provided as a single electrical RF communications medium that carries both downlink and uplink RF communications signals. The electrical management communications medium 32 in FIG. 1 also includes a separate downlink electrical management communications medium 32D and an uplink electrical management communications medium 32U. Alternatively, the downlink electrical management communications medium 32D and the uplink electrical management communications medium 32U may be provided as a single management communications medium that carries both downlink and uplink management communications signals. The electrical management communications mediums 30, 32 may be coaxial cables, for example.

Figure 2:
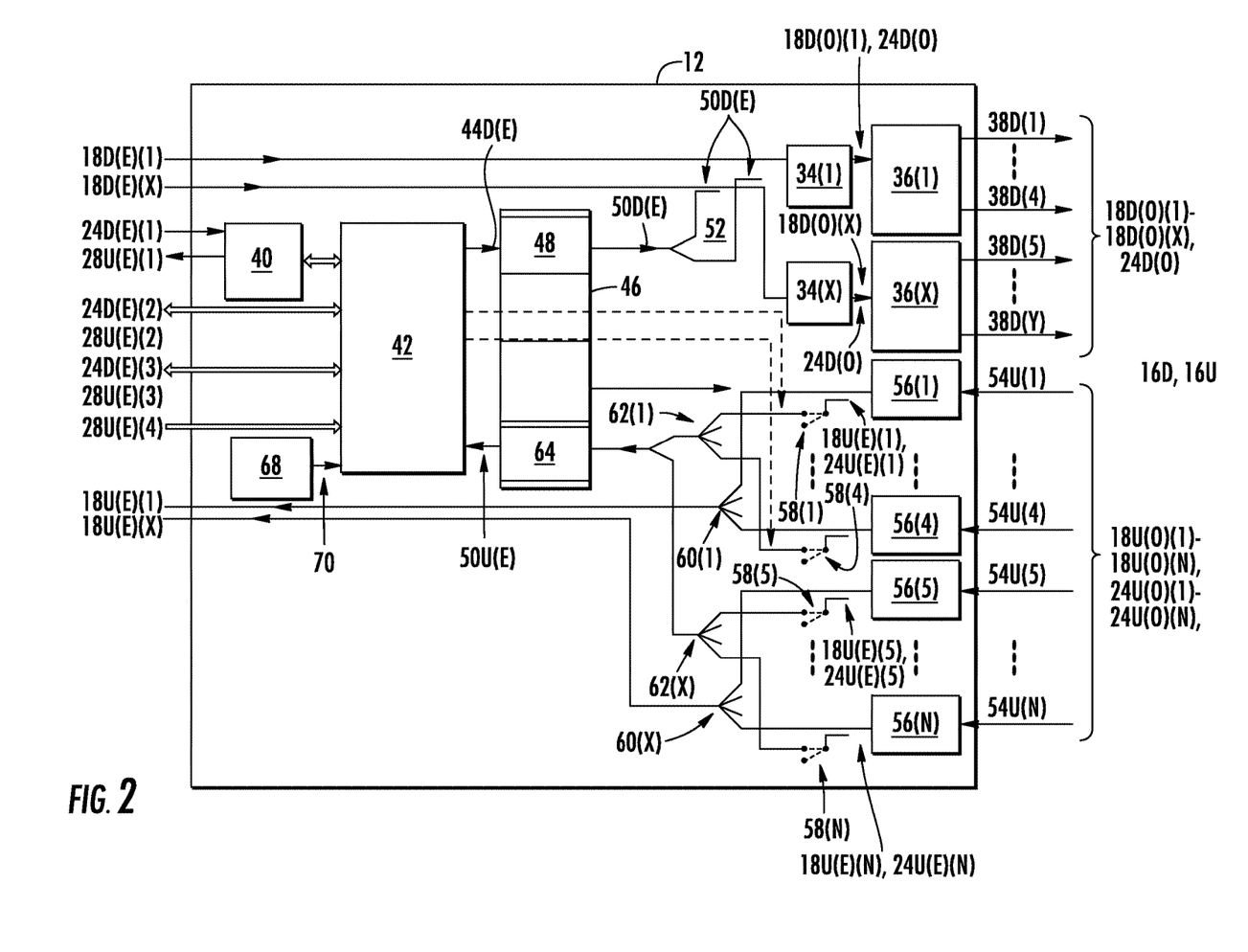
FIG. 2 is a schematic diagram of an exemplary central unit that can be employed in the optical fiber-based distributed antenna system in FIG. 3 for supporting distribution of RF communications services and management services to remote units in a point to multi-point configuration.

FIG. 2 is a schematic diagram of the central unit 12 in the distributed antenna system 10 in FIG. 1 to explain exemplary components provided therein in more detail. As illustrated in FIG. 2, in the downlink direction, a plurality of downlink electrical RF communications signals 18D(E)(1)-18D(E)(X) are received by the central unit 12, wherein 'X' signifies any number of signals. To convert the downlink electrical RF communications signals 18D(E)(1)-18D(E)(X) to optical RF communications signals, the laser diodes 34(1)-34(X) are provided. The laser diodes 34(1)-34(X) convert the downlink electrical RF communications signals 18D(E)(1)-18D(E)(X) into downlink optical RF communications signals 18D(O)(1)-18D(O)(X) to be communicated over the downlink optical fiber 16D. The downlink optical RF communications signals 18D(O)(1)-18D(O)(X) are split by optical splitters 36(1)-36(X), which are 1×4 splitters in this example, into 'Y' number of downlink optical RF communications channels 38D(1)-38D(Y). Each of the downlink optical RF communications channels 38D(1)-38D(Y) contains the downlink optical RF communications signals 18D(O)(1)-18D(O)(X). The downlink optical RF communications signals 18D(O)(1)-18D(O)(X) are split into the downlink optical RF communications channels 38D(1)-38D(Y) to provide each of the downlink optical RF communications signals 18D(O)(1)-18D(O)(X) to the remote units 14(1)-14(N).

A downlink electrical management signal 24D(E)(1), which is an Ethernet protocol management signal in this example, is received by the central unit 12 to be distributed to the remote units 14(1)-14(N). The downlink electrical management signal 24D(E)(1) is received in an Ethernet physical layer (PHY) circuit 40. The Ethernet PHY circuit 40 provides the downlink electrical management signal 24D(E)(1) to a media access controller 42 for processing before being distributed to the remote units 14(1)-14(N). The media access controller 42 translates and synchronizes the unsynchronized downlink electrical management signal 24D(E)(1) to a synchronized management signal. The media access controller 42 may be provided as a field programmable gate array (FPGA), ASIC, microprocessor or microcontroller, as non-limiting examples.

Figure 3A:
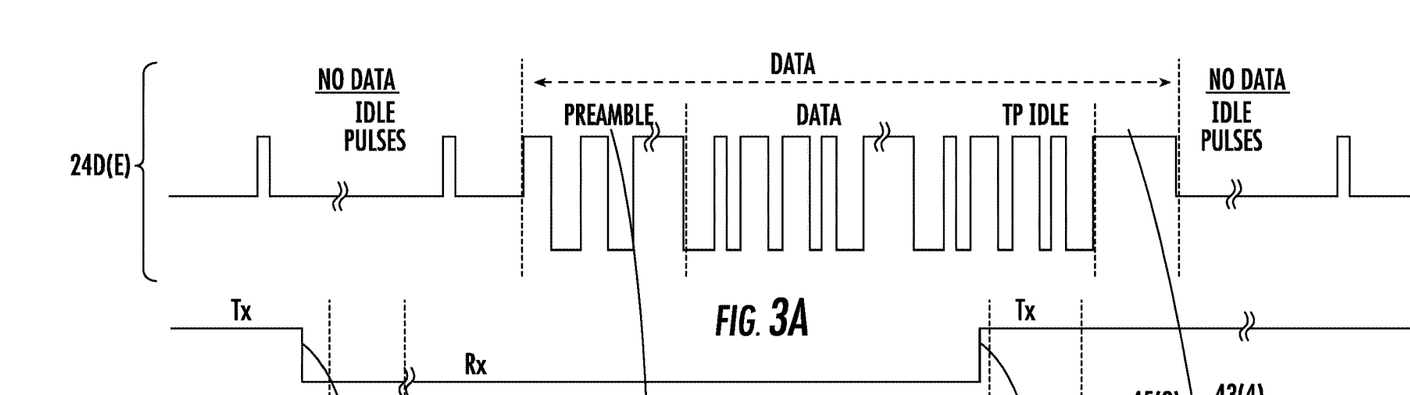
FIGS. 3A and 3B are exemplary timing diagrams of a management signal communicated in the distributed antenna system of FIG. 1 before and after being synchronized, respectively.
Figure 3B:
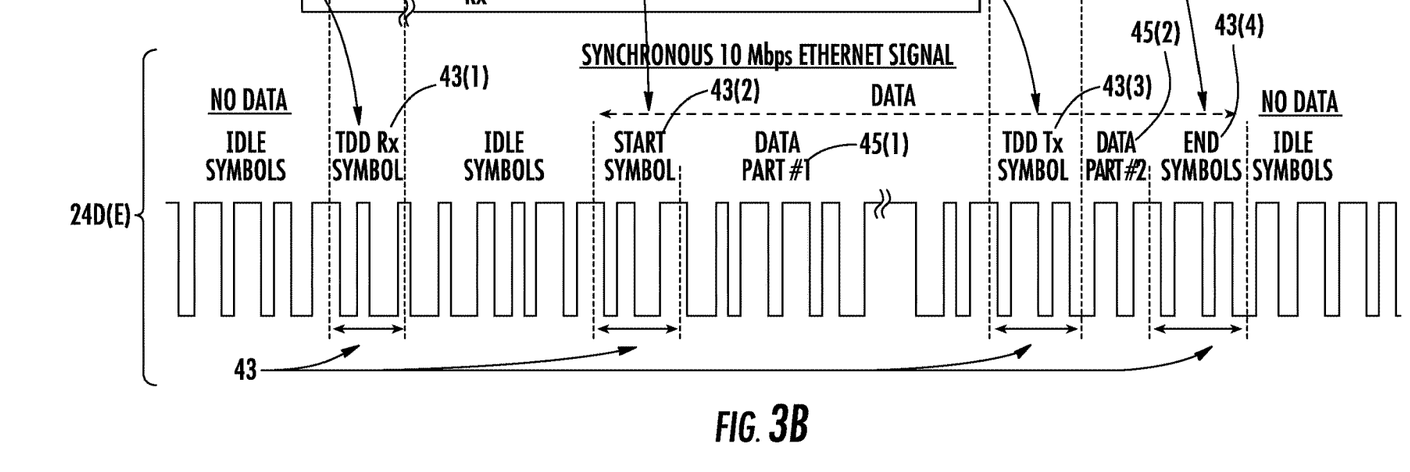

For example, FIGS. 3A and 3B are timing diagrams of an Ethernet protocol downlink electrical management signal 24D(E) before and after being synchronized, respectively. As illustrated in FIG. 3A, the downlink electrical management signal 24D(E) is provided as an Ethernet protocol signal, which may be a 10 Megabits per second (Mbps) signal as a non-limiting example. To create a synchronized downlink electrical management signal 24D(E) as provided in FIG. 3B, control symbols 43 are provided in the form of a time-divisional domain (TDD) receive symbol 43(1), a start symbol 43(2), a TDD transmit symbol 43(3), and an end symbol 43(4). Receive data 45(1) is inserted between start symbol 43(2) and the TDD transmit symbol 43(3). Transmit data 45(2) is inserted between the TDD transmit symbol 43(3) and the end symbol 43(4).

Figure 4:
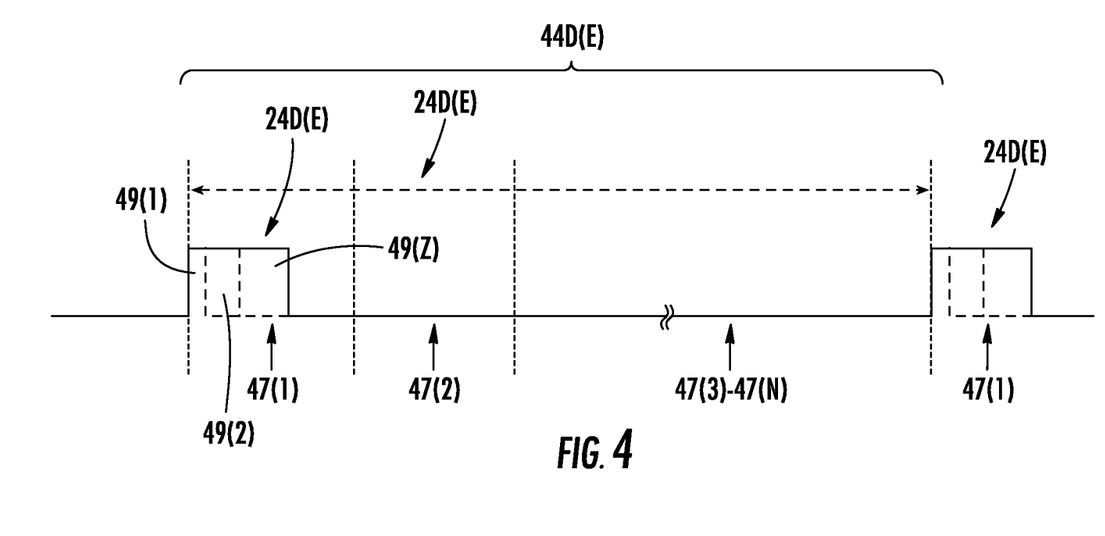
FIG. 4 is an exemplary multi-frame timing diagram of a synchronous, time-division multiplexed management frame signal communicated in the distributed antenna system of FIG. 1.

Referring back to FIG. 2, the media access controller 42 inserts the synchronized downlink electrical management signal 24D(E)(1) into a downlink electrical TDM management frame along with additional downlink control management signals 24D(E)(2), 24D(E)(3) from other sources, such as general purpose input-output (GPIO) fast signals (e.g., TDD, RS232) and GPIO slow signals, to provide a downlink electrical TDM management frame signal 44D(E). Downlink control signals may also include downlink configuration control management signals 24D(E)(4) as another example. FIG. 4 is an exemplary timing diagram of the downlink electrical TDM management frame signal 44D(E). As illustrated in FIG. 4, the synchronized downlink electrical management signals 24D(E) destined for particular remote units 14(1)-14(N) (shown in FIG. 1) are inserted into a time slot 47 corresponding to the remote unit 14(1)-14(N). For example, time slot 1 47(1) may correspond to remote unit 14(1). Time slot 2 47(2) may correspond to remote unit 14(2), and so on. Each time slot 47 can be split into several sub-slots 49(1)-49(Z), wherein one sub-slot 49 is used for transferring translated management packets, and the other sub-slots 49 are used for transferring other management control signals, such as additional downlink control management signals 24D(E)(2)-24D(E)(4). Each time slot 47 can be controlled to be fixed in size or variable in size depending on the bandwidth needs of the remote unit 14(1)-14(N) corresponding to the time slot 47. Also, some time slots 47 may not be required if there are not management signals for particular remote units 14(1)-14(N), which can allow this additional bandwidth to be used to vary the size of other used time slots 47. The remote units 14(1)-14(N) can parse the received downlink electrical TDM management frame signal 44D(E) to retrieve management signals for the particular remote unit 14(1)-14(N).

With reference back to FIG. 2, the downlink electrical TDM management frame signal 44D(E) is provided to a transceiver circuit 46 to be modulated by modulator 48 over an RF carrier frequency (e.g., between 2500-3000 MHz). In this manner, the transceiver circuit 46 may be configured to receive I-Q signals or single stream signal, as examples. Modulating the downlink electrical TDM management frame signal 44D(E) is optional. Modulating the downlink electrical TDM management frame signal 44D(E) may be desired to provide the downlink electrical TDM management frame signal 44D(E) in a frequency band (e.g., 2700-2900 MHz) that is different, but closer to the frequency band of the downlink electrical RF communications signals 18D(E)(1)-18D(E)(X) than a baseband or a lower modulation frequency to allow the same laser diodes 34(1)-34(X) to operate in their linear range to be used to convert the combined signal into an optical signal. This can save cost in avoiding dedicated laser diodes for converting downlink electrical TDM management frame signal 44D(E) and the downlink electrical RF communications signals 18D(E)(1)-18D(E)(X) into optical signals. In this regard, the modulated downlink electrical TDM management frame signal 50D(E) is split by splitter 52 and combined with the downlink electrical RF communications signals 18D(E)(1)-18D(E)(X). The corresponding plurality of combined downlink electrical RF communications signals 18D(E)(1)-18(E)(X) and downlink electrical TDM management frame signal 50D(E) are each provided to the corresponding laser diode 34(1)-34(X) to be converted into a plurality of combined downlink optical RF communications signals 18D(O)(1)-18D(O)(X) and downlink electrical TDM management frame signal 24D(O), respectively.

Figure 5:
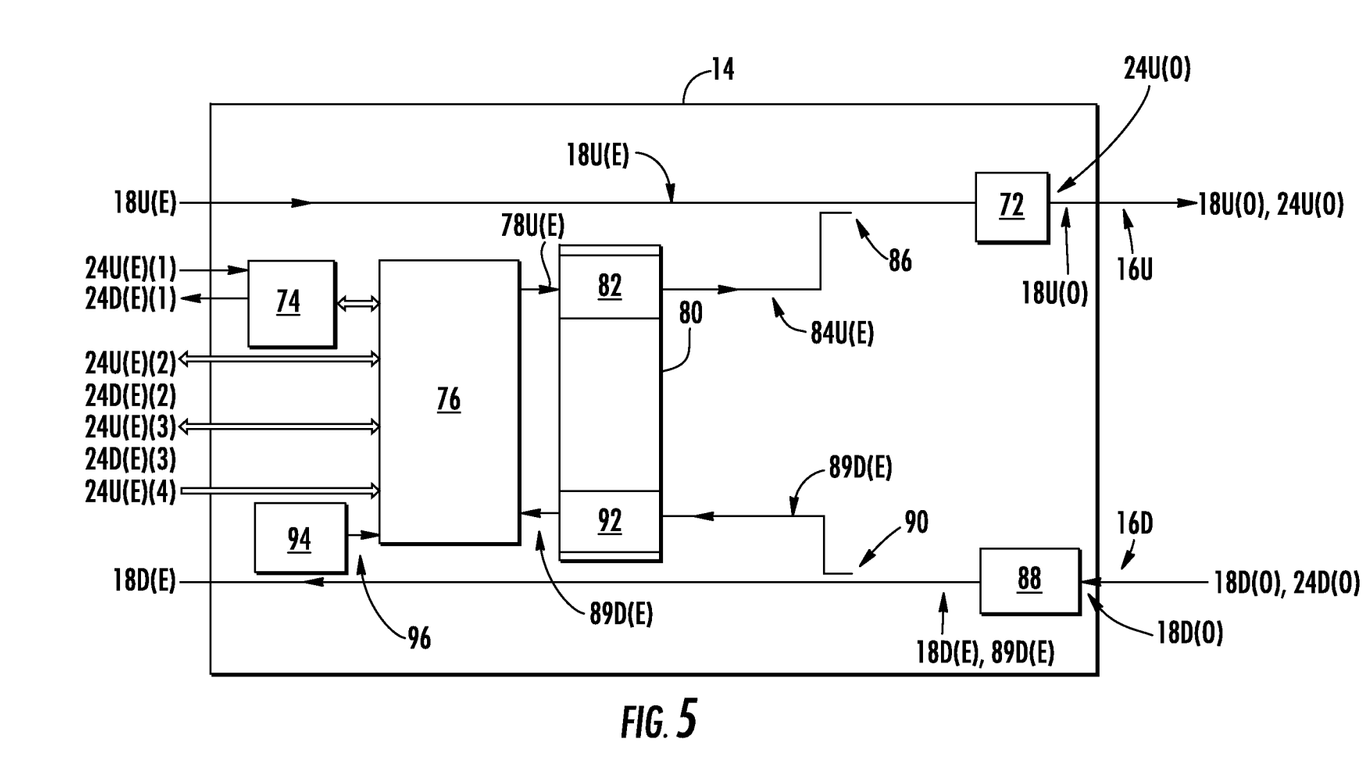
FIG. 5 is a schematic diagram of an exemplary remote unit that can be employed in the distributed antenna system in FIG. 1.

With continuing reference to FIG. 2, the plurality of combined downlink optical RF communications signals 18D(O)(1)-18D(O)(X) and downlink optical TDM management frame signals 24D(O) are each provided to optical splitters 36(1)-36(X). The optical splitters 36(1)-36(X) split the combined downlink optical RF communications signals 18D(O)(1)-18D(O)(X) and downlink optical TDM management frame signals 24D(O) into multiple downlink optical RF communications channels 38D(1)-38D(Y) to be distributed over the downlink optical fiber 16D to the remote units 14(1)-14(N). In this manner, each of the remote units 14(1)-14(N) receive the downlink optical RF communications signals 18D(O)(1)-18D(O)(X) and downlink optical TDM management frame signals 24D(O). FIG. 5, described in more detail below, discusses the processing of the received downlink optical RF communications signals 18D(O)(1)-18D(O)(X) and downlink optical TDM management frame signals 24D(O) by the remote units 14(1)-14(N).

In the uplink direction, each combined pair of uplink optical RF communications signals 18U(O)(1)-18U(O)(N) and uplink optical TDM management frame signals 24U(O)(1)-24U(O)(N) are received by the central unit 12 over separate channels 54U(1)-54U(N) from the remote units 14(1)-14(N). Each combined pair of uplink optical RF communications signals 18U(O)(1)-18U(O)(N) and uplink optical TDM management frame signals 24U(O)(1)-24U(O)(N) is provided to separate photodiodes 56(1)-56(N). The photodiodes 56(1)-56(N) convert each of the combined pairs of uplink optical RF communications signals 18U(O)(1)-18U(O)(N) and uplink optical TDM management frame signals 24U(O)(1)-24U(O)(N), into combined pairs of uplink electrical RF communications signals 18U(E)(1)-18U(E)(N) and uplink electrical TDM management frame signals 24U(E)(1)-24U(E)(N). The combined pairs of uplink electrical RF communications signals 18U(E)(1)-18U(E)(N) and uplink electrical TDM management frame signals 24U(E)(1)-24U(E)(N) are split by splitters 58(1)-58(N) to split the uplink electrical RF communications signals 18U(E)(1)-18U(E)(N) from the uplink electrical TDM management frame signals 24U(E)(1)-24U(E)(N). Then, each of the uplink electrical RF communications signals 18U(E)(1)-18U(E)(N) is combined by combiners 60(1)-60(X) to provide combined uplink electrical RF communications signals 18U(E)(1)-18U(E)(X) to be delivered to the base station(s) 20.

Each of the uplink electrical TDM management frame signals 24U(E)(1)-24U(E)(N) are combined by combiners 62(1)-62(X) to provide a combined uplink electrical TDM management frame signal 24U(E). The combined uplink electrical TDM management frame signal 24U(E) is provided to a demodulator 64 in the transceiver 46. The demodulator 64 demodulates the combined uplink electrical TDM management frame signal 24U(E) from its RF carrier and delivers the demodulated uplink electrical TDM management frame signal 24U(E) to the media access controller 42. The media access controller 42 translates the demodulated uplink electrical TDM management frame signal 24U(E) to a standard, desired protocol (e.g., Ethernet protocol) and also retrieves other control signals included therein, such as GPIO fast signals 28U(E)(2) and GPIO slow signals 28U(E)(3). The central unit 12 includes a references oscillator 68 that provides a reference signal 70 to be used by the media access controller 42 to translate the downlink electrical TDM management frame signal 24D(E) and demodulated uplink electrical TDM management frame signal 24U(E).

FIG. 5 is a schematic diagram of a remote unit 14 in the DAS 10 in FIG. 1 to explain certain components therein in more detail. Only one remote unit 14 is illustrated in FIG. 5, but note that the remote unit 14 in FIG. 5 can be provided as any of the remote units 14(1)-14(N) in the DAS 10 of FIG. 1. As illustrated in FIG. 3, in the uplink direction, an uplink electrical RF communications signal 18U(E) is received by the remote unit 14. To convert the uplink electrical RF communications signal 18U(E) to an optical RF communications signal, a laser diode 72 is provided. The laser diode 72 converts the uplink electrical RF communications signal 18U(E) into an uplink optical RF communications signal 18U(O) to be communicated over the uplink optical fiber 16U to the central unit 12.

With continuing reference to FIG. 5, an uplink electrical management signal 24U(E)(1), which is an Ethernet protocol management signal in this example, is received by the remote unit 14 to be distributed to the central unit 12. The uplink electrical management signal 24U(E)(1) is received in an Ethernet physical layer (PHY) circuit 74. The Ethernet PHY circuit 74 provides the uplink electrical management signal 24U(E)(1) to a media access controller 76 for processing before being distributed to the central unit 12. The media access controller 76 translates and synchronizes the unsynchronized uplink electrical management signal 24U(E)(1) to a synchronized protocol. The media access controller 76 inserts the synchronized uplink electrical management signal 24U(E)(1) into an uplink electrical TDM management frame along with additional uplink control management signals 24U(E)(2), 24U(E)(3) from other sources, such as general purpose input-output (GPIO) fast signals (e.g., TDD, RS232) and GPIO slow signals, to provide an uplink electrical TDM management frame signal 78U(E). The media access controller 76 may be provided as a field programmable gate array (FPGA), ASIC, microprocessor or micro-controller, as non-limiting examples.

With continuing reference to FIG. 5, the uplink electrical TDM management frame signal 78U(E) is provided to a transceiver circuit 80 to be modulated by modulator 82 over an RF carrier frequency (e.g., 2500-3000 MHz). The transceiver circuit 80 may be configured to receive I-Q signals or single stream signal, as examples. Modulating the uplink electrical TDM management frame signal 78U(E) is optional. Modulating the uplink electrical TDM management frame signal 78U(E) may be desired to provide the uplink electrical TDM management frame signal 78U(E) to be closer in frequency band to the uplink electrical RF communications signal 18U(E) (e.g., within 2700-2900 MHz) than baseband or a low frequency carrier to allow the laser diode 72 to operate in its linear range to convert the combined signal into an optical signal. In this regard, the modulated uplink electrical TDM management frame signal 84U(E) is combined with the uplink electrical RF communications signal 18U(E) by combiner 86. The combined uplink electrical RF communications signal 18U(E) and uplink electrical TDM management frame signal 78U(E) is provided to the laser diode 72 to be converted into a combined uplink optical RF communications signals 18U(O) and uplink optical TDM management frame signal 24U(O). The combined uplink optical RF communications signals 18U(O) and uplink optical TDM management frame signal 24U(O) is communicated over the uplink optical fiber 16U to the central unit 12.

In the downlink direction, a combined downlink optical RF communications signal 18D(O) and downlink optical TDM management frame signal 24D(O) is received by the remote unit 14 from the central unit 12. The combined downlink optical RF communications signal 18D(O) and downlink optical TDM management frame signal 24D(O) is provided to a photodiode 88. The photodiode 88 converts the combined downlink optical RF communications signal 18D(O) and downlink optical TDM management frame signal 24D(O), into a combined downlink electrical RF communications signal 18D(E) and downlink electrical TDM management frame signal 89D(E). The combined downlink electrical RF communications signal 18D(E) and downlink electrical TDM management frame signal 89D(E) are split by splitter 90 to split the downlink electrical RF communications signal 18D(E) from the downlink electrical TDM management frame signal 89D(E). The downlink electrical RF communications signal 18D(E) is delivered to the client device(s) 22.

The downlink electrical TDM management frame signal 89D(E) is provided to a demodulator 92 in the transceiver circuit 80. The demodulator 92 demodulates the downlink electrical TDM management frame signal 89D(E) from its RF carrier and delivers the demodulated downlink electrical TDM management frame signal 24D(E) to the media access controller 76. The media access controller 76 translates the demodulated uplink electrical TDM management frame signal 24D(E) to a standard, desired protocol (e.g., Ethernet protocol) and also retrieves other control signals included therein, such as GPIO fast signals 24U(E)(2) and GPIO slow signals 24U(E)(3). The remote unit 14 includes a reference oscillator 94 that provides a reference signal 96 to be used by the media access controller 76 to translate the demodulated downlink electrical TDM management frame signal 24D(E) and uplink electrical TDM management frame signal 24U(E).

Figure 6:
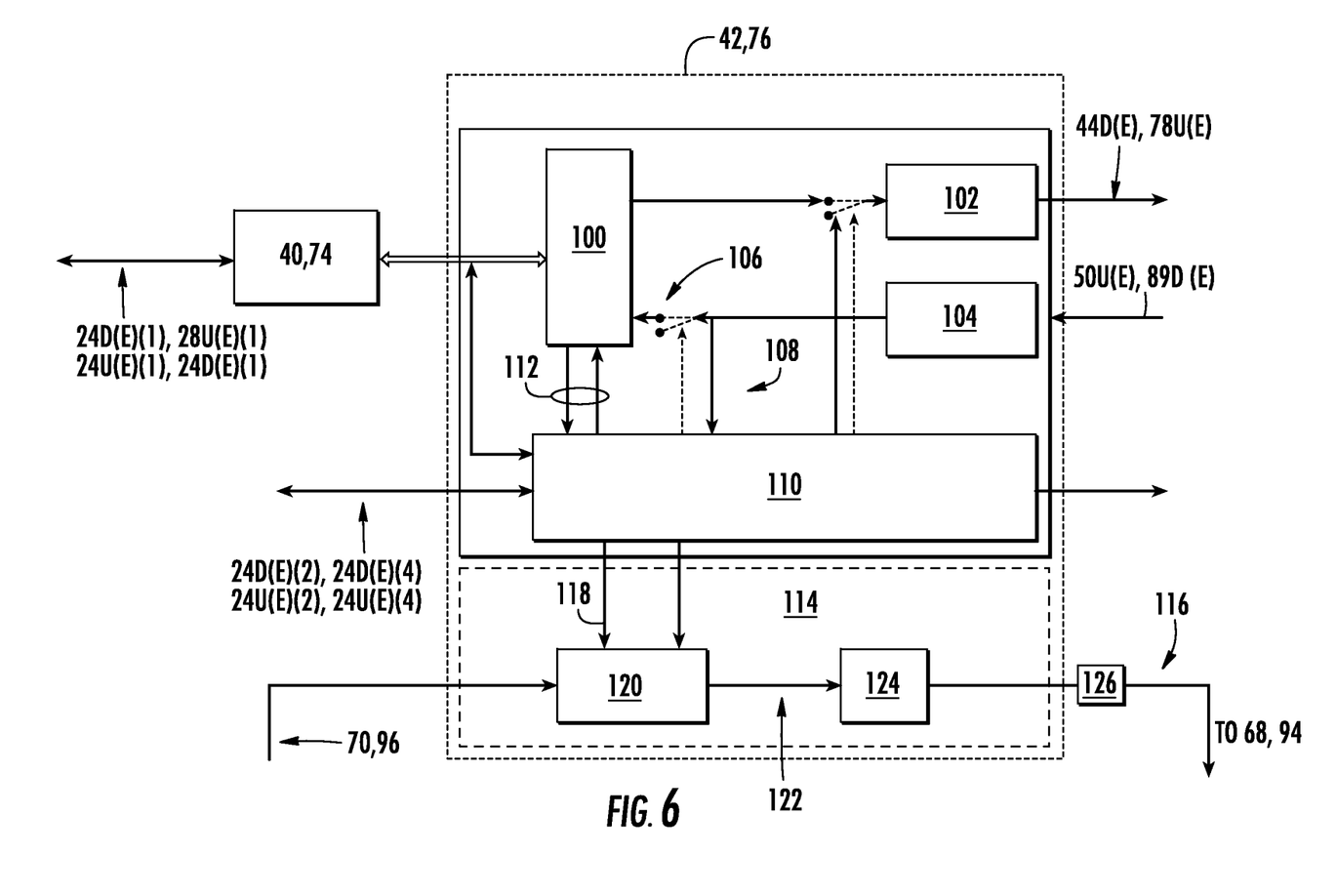
FIG. 6 is a schematic diagram illustrating more detail of an exemplary physical layer (PHY) circuit that may be employed in the central unit in FIG. 2 and the remote unit in FIG. 5.

FIG. 6 is a schematic diagram illustrating more exemplary detail of the exemplary media access controllers 42, 76 employed in the central unit 12 in FIG. 2 and the remote unit 14 in FIG. 5. A first in, first out (FIFO) buffer 100 is provided to store management signals received and transmitted. A Manchester encoder 102 is provided to encode the downlink electrical TDM management frame signal 44D(E) and the uplink electrical TDM management frame signal 78U(E). A Manchester decoder 104 is provided to decode the modulated downlink electrical TDM management frame signal 50D(E) and the downlink electrical TDM management frame signal 89D(E) into individual electrical management signals 106. The electrical management signals 106 are provided to the FIFO buffer 100. Control signals 108 embedded in the modulated downlink electrical TDM management frame signal 50D(E) and the downlink electrical TDM management frame signal 89D(E) are provided to a main control module 110 that controls the injection and extraction of timing, control, and signaling symbols when translating and de-translating management signals. The main control module 110 also controls the timing of the latching of signals in and out of the FIFO buffer 100 according to control signals 112.

The media access controllers 42, 76 also include a digital phase locked loop (PLL) circuit 114. The PLL circuit 114 phase locks the reference signals 70, 96 by sending control voltage signals 116 to the oscillators 68, 94. The reference signals 70, 96 are used by the management control module 110 to control the translation (e.g., sampling) of the management signals, as discussed above. The management control module 110 provides a clock recovery signal 118 extracted from management signals to the phase detector 120. The phase detector 120 compares the reference signals 70, 96 to output a phase difference signal 122 to a digital-to-analog converter 124 and low pass filter 126 to generate the control voltage signal 116 to control the oscillators 68, 94 to phase control the reference signals 70, 96 according to the clock recovery signal 118.

Note that downlink optical fiber 16D and uplink optical fiber 16U could be provided as a single optical fiber to carry combined downlink optical RF communications signals 18D(O)(1)-18D(O)(X), downlink electrical TDM management frame signal 24D(O), uplink TDM optical management signals 24U(O), and uplink optical RF communications signals 18U(O). Time-division multiplexing of the downlink and uplink signals may be employed to allow these downlink and uplink signals to be communicated over a single optical fiber. Wave-division multiplexing (WDM), such as discussed in U.S. patent application Ser. No. 12/892,424, incorporated herein by reference in its entirety, may also be employed in this scenario to prevent collisions between downlink and uplink communications signals in the same or overlapping frequency bands.

The RF communications services supported by the distributed antenna systems disclosed in this application, such as the DAS 10 may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, WiMax, WiFi, Digital Subscriber Line (DSL), and LTE, etc.

Figure 7:
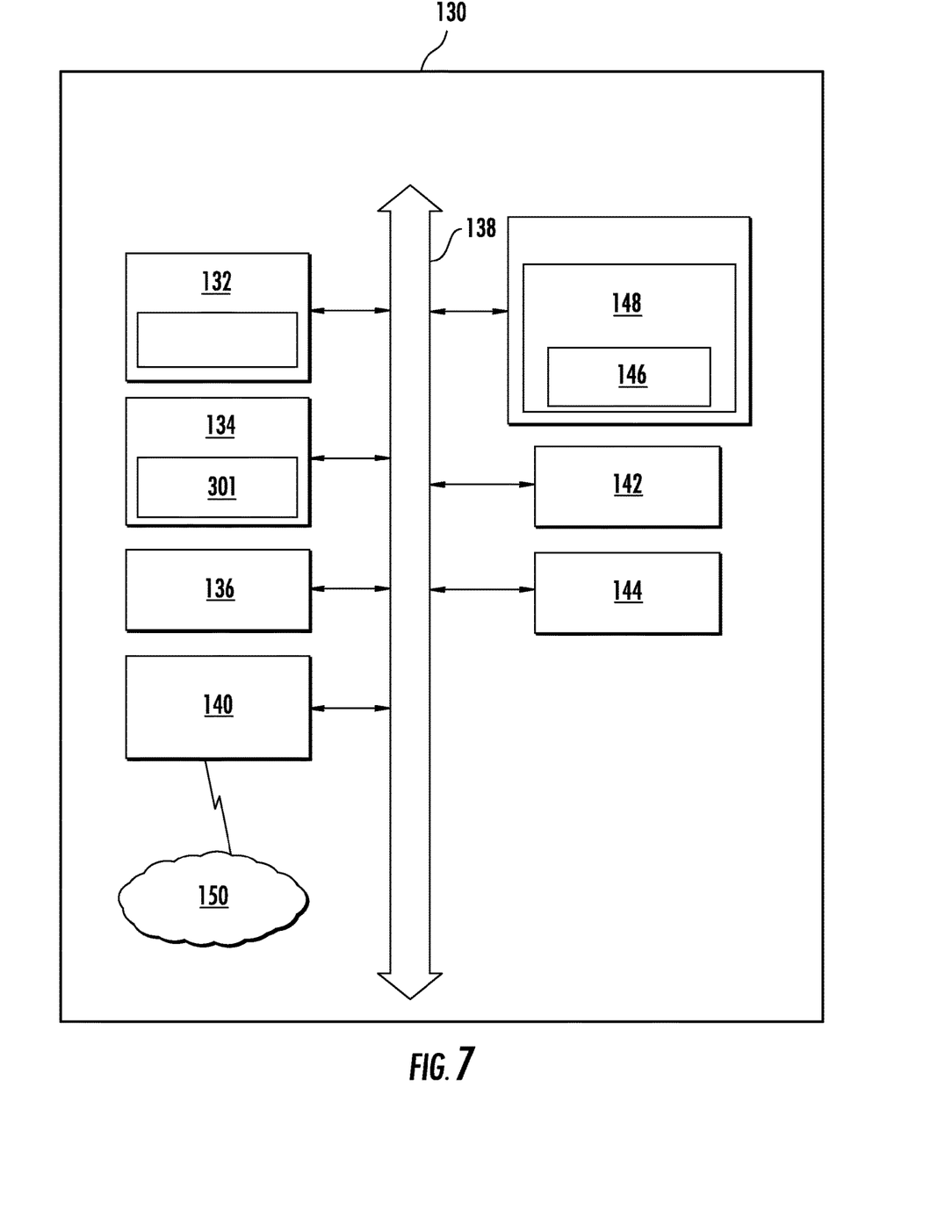
FIG. 7 is a schematic diagram of a generalized representation of an exemplary computer system that can be included in or interface with any of the RFIC chips provided in the exemplary distributed antenna systems and/or their components described herein.

Any of the DAS components disclosed herein can include a computer system. In this regard, FIG. 7 is a schematic diagram representation of additional detail regarding an exemplary form of a computer system 130 that is adapted to execute instructions from a computer-readable medium to perform power management functions and can be included in a distributed antenna system component(s). The computer system 130 includes a set of instructions for causing the distributed antenna system component(s) to provide its designed functionality. The DAS component(s) may be connected (e.g., networked) to other machines in a LAN, an intranet, an extranet, or the Internet. The DAS component(s) may operate in a client-server network environment, or as a peer machine in a peer-to-peer (or distributed) network environment. While only a single device is illustrated, the term "device" shall also include any collection of devices that individually or jointly execute a set (or multiple sets) of instructions to perform any one or more of the methodologies discussed herein. The DAS component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 130 in this embodiment includes a processing device or processor 132, a main memory 134 (e.g., read-only memory (ROM), flash memory, dynamic random access memory (DRAM) such as synchronous DRAM (SDRAM), etc.), and a static memory 136 (e.g., flash memory, static random access memory (SRAM), etc.), which may communicate with each other via the data bus 138. Alternatively, the processing device 132 may be connected to the main memory 134 and/or static memory 136 directly or via some other connectivity means. The processing device 132 may be a controller, and the main memory 134 or static memory 136 may be any type of memory.

The processing device 132 represents one or more general-purpose processing devices such as a microprocessor, central processing unit, or the like. More particularly, the processing device 132 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 132 is configured to execute processing logic in instructions 301 for performing the operations and steps discussed herein.

The computer system 130 may further include a network interface device 140. The computer system 130 also may or may not include an input 142 to receive input and selections to be communicated to the computer system 130 when executing instructions. The computer system 130 also may or may not include an output 144, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 130 may or may not include a data storage device that includes instructions 146 stored in a computer-readable medium 148. The instructions 146 may also reside, completely or at least partially, within the main memory 134 and/or within the processing device 132 during execution thereof by the computer system 130, the main memory 134 and the processing device 132 also constituting computer-readable medium. The instructions 146 may further be transmitted or received over a network 150 via the network interface device 140.

While the computer-readable medium 148 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. Storage media may be coupled to the processor such that the processor can read information from, and write information to, the storage medium, or integral to the processor. The processor and the storage medium may reside in an ASIC. The ASIC may reside in a remote station as discrete components in a remote station, base station, or server.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

We claim:

1. A wireless communications system comprising:
   at least one central unit configured to:
      receive a plurality of downlink management signals from at least one management controller for distribution to a respective plurality of remote units;
      time-division multiplex (TDM) the plurality of downlink management signals into time slots of the respective plurality of remote units to form a TDM downlink management frame signal;
      receive downlink radio frequency (RF) communication signals of at least one RF communications frequency band for at least one RF communications service;
      combine the TDM downlink management frame signal with the downlink RF communication signals; and
      send the combined TDM downlink management frame signal and the downlink RF communications signals to the plurality of remote units over a downlink communications link; and
   at least one of the plurality of remote units configured to:
      receive a plurality of uplink management signals from at least one client device;
      time-division multiplex (TDM) the plurality of uplink management signals into individual time slots to form a TDM uplink management frame signal;
      receive uplink RF communication signals of at least one RF communications frequency band for at least one RF communications service;
      combine the TDM uplink management frame signal with the uplink RF communication signals; and
      send the combined TDM uplink management frame signal and the uplink RF communications signals to the at least one central unit over an uplink communications link,
   wherein the central unit is further configured to receive a plurality of combined uplink RF communications signals and TDM uplink management frame signals over an uplink communications link from each of the plurality of remote units for the at least one RF communications service.

2. The system of claim 1, wherein the central unit is coupled to the plurality of remote units by at least one fiber optic communications medium.

3. The system of claim 2, wherein the central further comprises at least one optical-to-electrical converter configured to convert the plurality of combined uplink RF communications signals and TDM uplink management frame signals into a combined uplink optical RF communications signals and TDM uplink optical management frame signal.

4. The system of claim 3, wherein the central unit is further configured to modulate the TDM downlink management frame signal in a management services frequency band different from the at least one RF communications frequency band.

5. The system of claim 3, wherein each remote unit is configured to modulate the TDM uplink management frame signal in a management services frequency band different from the at least one RF communications frequency band.

6. The system of claim 2, wherein each remote unit comprises an electrical-to-optical converter.

7. The system of claim 1, wherein the central unit further comprises at least one electrical-to-optical converter configured to convert the combined TDM downlink management frame signal and the downlink RF communication signals into a combined TDM downlink optical management frame signal and downlink optical RF communications signals.

8. The system of claim 7, wherein each remote unit comprises an electrical-to-optical converter.

9. The system of claim 7, wherein the central unit is further configured to modulate the TDM downlink management frame signal in a management services frequency band different from the at least one RF communications frequency band.

10. A wireless communications system comprising:
    at least one central unit configured to:
       receive a plurality of downlink management signals from at least one management controller for distribution to a respective plurality of remote units;
       time-division multiplex (TDM) the plurality of downlink management signals into time slots of the respective plurality of remote units to form a TDM downlink management frame signal;
       receive downlink radio frequency RF communication signals of at least one RF communications frequency band for at least one RF communications service;
       combine the TDM downlink management frame signal with the downlink RF communication signals; and
       send the combined TDM downlink management frame signal and the downlink RF communications signals to the plurality of remote units over a downlink communications link; and
    at least one remote unit configured to:
       receive a plurality of uplink management signals from at least one client device;
       time-division multiplex (TDM) the plurality of uplink management signals into individual time slots to form a TDM uplink management frame signal;

receive uplink RF communication signals of at least one RF communications frequency band for at least one RF communications service;

combine the TDM uplink management frame signal with the uplink RF communication signals; and send the combined TDM uplink management frame signal and the uplink RF communications signals to the at least one central unit over an uplink communications link, wherein each remote unit comprises at least one electrical-to-optical converter configured to convert the combined TDM uplink management frame signal and the uplink RF communications signals into a combined TDM uplink optical management frame signal and uplink optical RF communications signals.

11. The system of claim 10, wherein each remote unit is further configured to receive a plurality of combined downlink RF communications signals and TDM downlink management frame signals over a downlink communications link from the central unit for the at least one RF communications service.

12. The system of claim 10, wherein the central unit is further configured to modulate the TDM downlink management frame signal in a management services frequency band different from the at least one RF communications frequency band.

13. The system of claim 10, wherein the central unit further comprises at least one electrical-to-optical converter configured to convert the combined TDM downlink management frame signal and the downlink RF communication signals into a combined TDM downlink optical management frame signal and downlink optical RF communications signals.

* * * * *